United States Patent
Shimizu et al.

(10) Patent No.: US 9,376,577 B2
(45) Date of Patent: Jun. 28, 2016

(54) COATING COMPOSITION AND COATING FILM FORMING METHOD

(75) Inventors: Hiroshi Shimizu, Hiratsuka (JP); Norio Fujita, Hiratsuka (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 13/521,800

(22) PCT Filed: Jan. 13, 2011

(86) PCT No.: PCT/JP2011/050435
§ 371 (c)(1),
(2), (4) Date: Jul. 12, 2012

(87) PCT Pub. No.: WO2011/087054
PCT Pub. Date: Jul. 21, 2011

(65) Prior Publication Data
US 2012/0295032 A1     Nov. 22, 2012

(30) Foreign Application Priority Data
Jan. 13, 2010    (JP) ................................ 2010-004925

(51) Int. Cl.
```
B05D 1/36    (2006.01)
C09D 1/00    (2006.01)
C09D 7/12    (2006.01)
C09C 1/36    (2006.01)
C09C 1/40    (2006.01)
C09C 1/64    (2006.01)
C08K 3/22    (2006.01)
```

(52) U.S. Cl.
CPC ............... *C09D 7/1216* (2013.01); *C09C 1/36* (2013.01); *C09C 1/3684* (2013.01); *C09C 1/40* (2013.01); *C09C 1/64* (2013.01); *C09D 7/1266* (2013.01); *C09D 7/1275* (2013.01); *C01P 2006/62* (2013.01); *C01P 2006/65* (2013.01); *C08K 3/22* (2013.01)

(58) Field of Classification Search
USPC ...................................................... 427/419.2
See application file for complete search history.

(56) References Cited

U.S. PATENT DOCUMENTS

| | | | | |
|---|---|---|---|---|
| 6,992,277 | B2 * | 1/2006 | Masuda et al. ............... | 250/226 |
| 2002/0090461 | A1 * | 7/2002 | Ohmoto et al. ............... | 427/402 |
| 2002/0163640 | A1 | 11/2002 | Masuda | |
| 2003/0048942 | A1 * | 3/2003 | Masuda ......................... | 382/165 |
| 2009/0185992 | A1 * | 7/2009 | Conan et al. .................... | 424/61 |
| 2009/0253853 | A1 * | 10/2009 | Lin et al. ....................... | 524/497 |

FOREIGN PATENT DOCUMENTS

| | | |
|---|---|---|
| CN | 1954037 | 4/2007 |
| JP | 7-292294 | 11/1995 |
| JP | 10-010045 | 1/1998 |
| JP | 2000-204296 | 7/2000 |
| JP | 2002-201422 | 7/2002 |
| JP | 2002-201423 | 7/2002 |
| JP | 2002-201424 | 7/2002 |
| JP | 2002-201425 | 7/2002 |
| JP | 2002-259398 | 9/2002 |
| JP | 2003-064315 | 3/2003 |
| JP | 2003-145661 | 5/2003 |
| JP | 2003-236465 | 8/2003 |
| JP | 2009-291713 | 12/2009 |
| WO | 2005/111152 | 11/2005 |

OTHER PUBLICATIONS

International Search Report issued Apr. 19, 2011 in International (PCT) Application No. PCT/JP2011/050435, of which the present application is the national stage.

The website of Ishihara Sangyo Kaisha, Ltd., Kinoh-Zairyo, Cho-biryushi Titan, accessed May 23, 2014, with English language translation thereof.

Ohmura et al., "Development of 'Cosmo Silver' for Soarer, Toyota", Toryo no Kenkyu, No. 140, May 2003, with English language abstract thereof.

Kazuyuki Tachi, "Mechanism of Aluminum Flake Orientation in Metallic Waterborne Basecoat Applied in Two-Coat Process", J. Jpn. Soc. Colour Mater., vol. 80, No. 4, pp. 149-156, 2007, with English language abstract thereof.

* cited by examiner

*Primary Examiner* — Alexander Weddle

(74) *Attorney, Agent, or Firm* — Wenderoth, Lind & Ponack, L.L.P.

(57) ABSTRACT

The present invention relates to a coating composition containing a colored aluminum pigment and a titanium oxide pigment, wherein in the case where a coating film formed from the coating composition is illuminated at 45 degrees with respect to the surface of the coating film, a ratio of lightness $L^*$ of light observed at 45 degrees with respect to specularly reflected light, relative to lightness $L^*$ of light observed at 110 degrees with respect to specularly reflected light is within a range of 1.00 to 1.50. The invention further relates to a method for forming a coating film, including steps of applying the above-described coating composition to a substrate; and further applying a clear coating composition thereto.

7 Claims, No Drawings

COATING COMPOSITION AND COATING FILM FORMING METHOD

TECHNICAL FIELD

The present invention relates to a coating composition and a method for forming a coating film, the composition and the method being capable of producing a coating color that has high chroma at the highlight (in the vicinity of specularly reflected light) and that shows a small lightness change from the face (between the highlight and the shade) to the shade (in an oblique direction).

BACKGROUND ART

With respect to industrial products such as automobiles, a coating color that has high chroma at the highlight (in the vicinity of specularly reflected light) and that shows a small lightness change from the face (between the highlight and the shade) to the shade (in an oblique direction) has greater appeal as a refreshing and warm coating color, among metallic colors, which appear to be different depending on the observation angle. A known method for producing a coating color having high chroma at the highlight and showing a small lightness change from the face to the shade involves combining an aluminum flake pigment, a color pigment, and, in addition, a particulate titanium oxide pigment. However, such a method suffers from problems such that the chroma at the highlight can be insufficient, and that cloudiness can occur at the shade.

Heretofore, coating compositions comprising a combination of: a mixture of particulate titanium dioxide (particulate titanium oxide) and aluminum flake; a metal oxide complex pigments; and various effect pigments, are known (Patent Literature 1 to 4). However, all of such coating compositions are intended to simply change hue depending on the observation angle, using the difference in the mechanism of color development between a metal oxide complex pigments and an effect pigment. Such compositions do not produce a coating color having high chroma at the highlight and showing a small change in lightness from the face to the shade.

CITATION LIST

Patent Literature

Patent Literature 1: Japanese Unexamined Patent Publication No. 2002-201422
Patent Literature 2: Japanese Unexamined Patent Publication No. 2002-201423
Patent Literature 3: Japanese Unexamined Patent Publication No. 2002-201424
Patent Literature 4: Japanese Unexamined Patent Publication No. 2002-201425

SUMMARY OF INVENTION

Technical Problem

An object of the present invention is to provide a coating composition and a method for forming a coating film, both of which are capable of producing a coating color that has high chroma at the highlight (in the vicinity of specularly reflected light) and that shows a small lightness change from the face (between the highlight and the shade) to the shade (in an oblique direction).

Solution to Problem

The present invention relates to the following:

Item 1. A coating composition comprising a colored aluminum pigment and a titanium oxide pigment, wherein in the case where a coating film formed from the coating composition is illuminated at 45 degrees with respect to the surface of the coating film, a ratio of lightness $L^*$ in the $L^*a^*b^*$ color scale based on the spectral reflectance of light observed at 45 degrees with respect to the specularly reflected light, relative to lightness $L^*$ in the $L^*a^*b^*$ color scale based on the spectral reflectance of light observed at 110 degrees with respect to the specularly reflected light is within a range of 1.00 to 1.50.

Item 2. The coating composition according to Item 1, wherein the titanium oxide pigment has a mean particle size of 10 to 400 nm.

Item 3. The coating composition according to Item 1, wherein a portion or all of the titanium oxide pigment is a particulate titanium oxide pigment having a mean particle size of 20 to 80 nm.

Item 4. A method for forming a coating film, comprising steps of applying the coating composition of any one of Items 1 to 3 to a substrate; and further applying a clear coating composition thereto.

Advantageous Effects of Invention

The present invention provides a coating composition and a method for forming a coating film, both of which are capable of producing a coating color having high chroma at the highlight (in the vicinity of specularly reflected light) and showing a small lightness change from the face (between the highlight and the shade) to the shade (in an oblique direction).

Description of Embodiments

Colored Aluminum Pigment

For the purpose of increasing the chroma at the highlight, the coating composition of the present invention comprises a colored aluminum pigment. A colored aluminum pigment comprises an aluminum flake substrate whose surface is coated with a colored layer. Examples thereof include a pigment comprising an aluminum flake whose surface is chemisorbed with a color pigment via a thermopolymer having one or more double bonds and two or more carboxyl groups, the thermopolymer being obtained by thermal polymerization of one or more double bond-containing carboxylic acids; and a pigment comprising an aluminum flake whose surface is chemisorbed with a color pigment and is further coated thereon with a polymer obtained from a radically polymerizable unsaturated carboxylic acid and a monomer containing three or more radically polymerizable double bonds.

Here, the radically polymerizable unsaturated carboxylic acid represents a carboxylic acid having one or more radically polymerizable unsaturated groups. As used herein, a radically polymerizable unsaturated group means an unsaturated group that can undergo radical polymerization. Examples of such polymerizable unsaturated groups include a vinyl group, a (meth)acryloyl group, and the like.

Here, the color pigment determines the hue of a colored aluminum pigment. Color pigments usable herein can be suitably selected from known organic or inorganic pigments for coating compositions or for ink. Specific examples of color pigments include organic pigments, such as azo pigments, quinacridone pigments, diketopyrrolopyrrole pigments, perylene pigments, perinone pigments, benzimidazolone pigments, isoindoline pigments, isoindolinone pigments, metal chelate azo pigments, phthalocyanine pigments, anthraquinone pigments, dioxazine pigments, threne pigments, indigo pigments, and the like.

In addition to the above-mentioned pigment comprising an aluminum flake whose surface is coated with a color pigment, a pigment comprising an aluminum flake whose surface is coated with a metal oxide such as iron oxide by a gas phase method can also be used as the colored aluminum pigment of the present invention.

The colored aluminum pigment preferably has a mean particle size of 5 to 40 µm, more preferably 7 to 30 µm, and still more preferably 8 to 25 µm, from the viewpoint of the finishing performance and the chroma at the highlight of the resulting coating film. The thickness is preferably within a range of 0.05 to 0.5 µm. The mean particle size and thickness used herein refer to values obtained by observing the colored aluminum pigment with an optical microscope or an electron microscope; or values measured with a particle size distribution analyzer with a laser, such as laser diffractometry.

From the viewpoint of the finishing performance of the resulting coating film, the total content of the colored aluminum pigment is preferably 1 to 30 parts by mass, more preferably 2 to 25 parts by mass, and still more preferably 3 to 18 parts by mass, relative to 100 parts by mass of the resin solids content of the coating composition.

Titanium Oxide Pigment

The coating composition of the present invention comprises a titanium oxide pigment, for the purpose of inhibiting the lightness change from the face (between the highlight and the shade) to the shade (in an oblique direction) in the resulting coating film. The titanium oxide pigment preferably has a mean particle size of 10 nm to 400 nm, from the viewpoint of effect on inhibition of the lightness change from the face (between the highlight and the shade) to the shade (in an oblique direction) in the resulting coating film. The mean particle size of the titanium oxide pigment is measured through observation with an electron microscope.

There is no particular limitation to the titanium oxide pigment. For example, those that can be produced by a general sulfate process or chloride process can be used. Further, in order to improve the weather resistance, the titanium oxide pigment may be those that have been surface-treated with an oxide or hydroxide, such as silica, alumina, or zirconia; those that have been surface-treated with an organosilicon compound such as poly dimethylsiloxane as a typical example, a higher fatty acid such as stearic acid as a typical example, or an organic titanium compound such as isopropyl triisostearoyl titanate as a typical example; or the like.

In the coating composition of the present invention, it is preferable that a portion or all of the titanium oxide pigment is a particulate titanium oxide pigment having a mean particle size of 20 to 80 nm, in terms of improving the chroma of the resulting coating film. Specifically, the titanium oxide pigment may comprise a particulate titanium oxide pigment having a mean particle size of 20 to 80 nm. Due to a small particle size, the particulate titanium oxide pigment has a high degree of transparency, and the light-scattering effect thereof causes a subtle hue change depending on the observation angle.

The above-described titanium oxide pigment is contained in the coating composition of the present invention in an amount of 0.01 to 50 parts by mass, preferably 0.05 to 30 parts by mass, and more preferably 0.1 to 25 parts by mass, on a solids basis, relative to 100 parts by mass of the resin solids content of the coating composition, from the viewpoint of effect on inhibition of a lightness change from the face (between the highlight and the shade) to the shade (in an oblique direction) in the resulting coating film.

The ratio of the content of the colored aluminum pigment to the content of the titanium oxide pigment is preferably 99:1 to 30:70, and more preferably 90:10 to 40:60, based on solids mass ratio, in order to allow the resulting film to have higher chroma at the highlight and higher lightness at the shade.

For the purpose of adjusting the hue of the resulting coating film, the coating composition of the present invention may further comprise a color pigment. There is no particular limitation on color pigments. Specific examples thereof include inorganic pigments, such as complex oxide pigments such as transparent iron oxide pigment and titan yellow; and organic pigments, such as azo pigments, quinacridone pigments, diketopyrrolopyrrole pigments, perylene pigments, perinone pigments, benzimidazolone pigments, isoindoline pigments, isoindolinone pigments, metal chelate azo pigments, phthalocyanine pigments, anthraquinone pigments, dioxazine pigments, threne pigments, and indigo pigments. Such color pigments may arbitrarily be used singly, or in a combination of two or more of those selected from the above.

In the case where the coating composition of the present invention comprises a color pigment, the content of the color pigment is preferably within a range of 0.01 to 30 parts by mass, more preferably within a range of 0.05 to 25 parts by mass, and still more preferably within a range of 0.5 to 20 parts by mass, relative to 100 parts by mass of the resin solids content of the coating composition, from the viewpoint of the chroma at the highlight and the lightness at the shade in the resulting coating film.

The coating composition of the present invention may usually contain a resin component as a vehicle. Specific examples of resin components include a combination of a base resin with a crosslinking agent. Examples of base resins include those having crosslinkable functional groups (e.g., hydroxyl), such as acrylic resin, polyester resin, alkyd resin, and urethane resin. Examples of crosslinking agents include melamine resin, urea resin, and a polyisocyanate compound (including a blocked polyisocyanate compound). Such resin components are used after being dissolved or dispersed in an organic solvent and/or a solvent, such as water.

The coating composition of the present invention may further comprise a solvent, such as water or an organic solvent; various additives, such as a pigment dispersant, an antisettling agent, a curing catalyst, an antifoaming agent, an antioxidant, a UV absorber, a surface control agent, and a rheology control agent; an extender pigment; and the like, if necessary.

As long as the effects of the present invention are not impaired, the coating composition of the present invention may also comprise non-colored aluminum. It is preferable that the coating composition of the present invention does not or substantially does not contain such non-colored aluminum. In the case where the coating composition of the present invention contains such non-colored aluminum, the amount thereof is generally preferably 15 parts or less, relative to 100 parts of the colored aluminum.

The coating composition of the present invention can be prepared by mixing and dispersing the above-described components. It is preferable to adjust the solids content at the time of application to 12 to 60 mass %, more preferably 15 to 50 mass %, based on the coating composition, and the viscosity at 20° C. to 17 to 23 seconds (Ford cup No. 3).

The coating composition of the present invention is characterized with respect to the coating film formed therefrom, in that the ratio of lightness $L^*$ in the $L^*a^*b^*$ color scale based on the spectral reflectance of light observed at 45 degrees with respect to the specularly reflected light from the coating film illuminated at 45 degrees with respect to its surface, relative to L* based on the spectral reflectance of light observed at 110 degrees is within a range of 1.00 to 1.50. Specifically, in the case where a coating film is illuminated at 45 degrees with respect to its surface, the lightness L* of the light observed at 45 degrees with respect to the specularly reflected light is regarded as L*45, and the lightness L* of the light observed at 110 degrees is regarded as L*110; and L*45/L*110, in which L*45 is divided by L*110, is within a range of 1.00 to 1.50. More specifically, for example, with respect to a coating film obtained by applying the above-described coating composition as a cured coating film to a film thickness of 20 μm to a coated plate comprising as a base coat a preliminary formed coating film having a gray color (N-6), the lightness L* can be measured using MA68II produced by X-Rite, Inc. (tradename, a multi-angle spectrophotometer). The L*a*b* color scale was specified by the International Commission on Illumination in 1976, and is employed in JIS Z 8729. L* is a value representing lightness. The above ratio closer to 1 indicates that the lightness change from the face (between the highlight and the shade) to the shade (in an oblique direction) is more inhibited.

Method for Forming a Coating Film

The present invention provides a method for forming a coating film, comprising applying the above-described coating composition to a substrate, and applying a clear coating composition to the resulting coating film.

Examples of substrates include iron, zinc, aluminum, magnesium, and like metals; alloys comprising these metals; shaped articles plated or vapor-deposited with these metals; shaped articles of, for example, glass, plastic, and a foamed body; and the like. Depending on its material, a degreasing treatment, a surface treatment, or the like, may suitably be carried out to obtain a substrate. The above-mentioned substrates may be further coated with an undercoating film and/or an intermediate coating film. Such a substrate comprising an undercoating film and/or an intermediate coating film is particularly preferable.

The undercoating film is formed to conceal the surface of the substrate, or to impart corrosion resistance, rust resistance, or the like, to the substrate. The undercoating film can be formed by applying, drying, and curing an undercoating composition. There is no particular limitation to the types of the undercoating composition. Examples thereof include an electrodeposition coating composition, a solvent-based primer, and the like.

The intermediate coating film is formed to conceal the surface of the substrate or the surface of the undercoating film, or to impart an adhesion property, chipping resistance, or the like. The intermediate coating film can be formed by applying an intermediate coating composition to the surface of the substrate or the undercoating film, and drying and curing the applied coating composition. There is no particular limitation to the types of the intermediate coating composition. Known intermediate coating compositions may be used. For example, organic solvent based- or aqueous based-intermediate coating compositions comprising, as essential components, a thermosetting resin composition and a color pigment, are preferably used.

In particular, in the case where an undercoating film or intermediate coating film is formed on the substrate, the undercoating film or intermediate coating film is heated and cured by crosslinking; and subsequently, a coating composition used in the subsequent step described below can be applied thereto. Alternatively, the application of the coating composition of the present invention may be performed when the undercoating film and/or intermediate coating film is in an uncured state.

The coating composition of the present invention may be applied to the substrate by electrostatic coating, air spray coating, airless spray coating, or the like. It is preferable that the thickness thereof is 5 to 30 μm when cured, in order to impart excellent smoothness to the resulting coating film. In general, the coating composition of the present invention is applied to obtain a predetermined film thickness; and subsequently, the resulting film can be heated, dried, and cured. However, the application of a clear coating composition described below may be performed when the coating film formed from the coating composition of the present invention is in an uncured state. In case of a thermo-setting type, the coating film formed from the coating composition of the present invention can generally be cured by crosslinking at a temperature of about 50° C. to 150° C.; and in case of a forced drying type or a normal temperature drying type, the coating film formed from the coating composition of the present invention can be cured by crosslinking at a temperature in a range of an ordinary temperature to about 80° C.

The clear coating composition used in the method of the present invention is applied to the cured or uncured surface of the coating film formed from the coating composition described above. The clear coating composition contains as main components a resin component and a solvent, and optionally contains, for example, one or more other additives for coating compositions. The clear coating composition is a liquid coating composition that forms a colorless or colored transparent coating film.

There is no limitation to the clear coating composition used in the method of the present invention, and hitherto known clear coating compositions can be used. For example, liquid or powder coating compositions containing a base resin and a crosslinking agent can be used. Example of base resins include acrylic resins, polyester resins, alkyd resins, fluororesins, urethane resins, and silicon-containing resins that contain hydroxy, carboxy, silanol, epoxy and like crosslinkable functional groups. Examples of crosslinking agents include melamine resins, urea resins, polyisocyanate compounds, blocked polyisocyanate compounds, epoxy compounds or resins, carboxy-containing compounds or resins, acid anhydride, and alkoxysilane-containing compounds or resins that can react with the base resin. In addition, water, organic solvent and like solvents; and curing catalysts, antifoaming agents, UV absorbers, rheology control agents, antioxidants, surface modifiers and like additives may also be suitably incorporated into the clear coating composition, if necessary.

The clear coating composition used in the method of the present invention may contain a color pigment in such an amount that the transparency of the clear coating composition is not impaired. As the color pigment, hitherto known pigments for ink or coating compositions may be used. These pigments may be used singly, or in a combination of two or more. The amount of the color pigments added to the clear coating composition may be suitably selected, and is 30 parts by mass or less, preferably 0.01 to 15 parts by mass, and more preferably 0.01 to 10 parts by mass, relative to 100 parts by mass of the resin solids content of the clear coating composition.

The clear coating composition of the present invention can be applied by electrostatic coating, air spray coating, airless spray coating, or the like. The thickness thereof is preferably 15 to 70 μm when cured. In case of a thermo-setting type, the coating film formed from the clear coating composition can generally be cured by crosslinking at a temperature of about 50° C. to 150° C.; and in case of a forced drying type or a normal temperature drying type, the coating film formed from the clear coating composition can be cured by crosslinking at a temperature in a range of an ordinary temperature to about 80° C.

The method for forming a multilayer coating film of the present invention may comprise, as described above, applying the coating composition of the present invention to a substrate; performing heating, drying, and curing of the resulting film; applying the above-described clear coating composition to the resulting coating film; and performing heating, drying, and curing of the resulting film. In the method of the present invention, it is also possible to form a multilayer coating film by applying the coating composition of the present invention to a substrate, applying the above-mentioned clear coating composition to the resulting coating film that is in an uncured state, and heating the resulting films to simultaneously dry and cure these films.

EXAMPLES

Hereinafter, the present invention is described in more detail with reference to Examples and Comparative Examples. However, the present invention is not limited to these Examples. Note that "parts" and "%" are expressed on a mass basis. Hereinafter, the present invention is described in further detail, with reference to the Examples.

Examples 1 to 6 and Comparative Examples 1 to 4

Production Example 1

Production of Hydroxy-Containing Acrylic Resin 50 parts of ethylene glycol monoethyl ether acetate was placed in a reaction vessel equipped with a thermometer, a thermostat, a stirrer, a reflux condenser, and a dropping funnel, then stirred and mixed. The mixture was heated to 135° C. Subsequently, a mixture of monomer/polymerization initiator described below was added dropwise over 3 hours to the reaction vessel maintained at the same temperature. After completion of the dropwise addition, the mixture was aged for 1 hour.

Thereafter, a mixture comprising 10 parts of ethylene glycol monoethyl ether acetate and 0.6 parts of 2,2'-azobis(2-methylpropionitrile) was added dropwise to the reaction product over 1 hour and 30 minutes while maintaining the same temperature, and the resulting product was aged for another 2 hours. Then, the ethylene glycol monoethyl ether acetate was distilled off under a reduced pressure, thereby obtaining a hydroxy-containing acrylic resin having a hydroxy value of 54 mg KOH/g, a number average molecular weight of 20,000, and a resin solids content of 65 mass %. The term "number average molecular weight" used herein represents a value determined by gel permeation chromatography (GPC) using the calibration curve of standard polystyrene.

Mixture of monomer/polymerization initiator: a mixture comprising 38 parts of methyl methacrylate, 17 parts of ethyl acrylate, 17 parts of n-butyl acrylate, 7 parts of hydroxyethyl methacrylate, 20 parts of lauryl methacrylate, and 1 part of acrylic acid; and 2 parts of 2,2'-azobis(2-methylpropionitrile)

Preparation of Coating Composition

An effect pigment and a color pigment were added at a ratio shown in Table 1 per 100 parts (solids content) of a resin component comprising 75 parts of the hydroxy-containing acrylic resin obtained in Production Example 1 and 25 parts of U-Van 28-60 (tradename, butyl-etherified melamine resin, produced by Mitsui Chemicals, Inc.). The mixture was stirred and mixed, then diluted to a viscosity appropriate for coating, and an organic solvent-based coating composition having a solids content of about 25% was prepared. Thereby, a coating composition used in the Examples and Comparative Examples was prepared.

TABLE 1

| | Pigment Composition | | Colorimetric Value | | Lightness Change | Visual Observation |
|---|---|---|---|---|---|---|
| | Pigment Type | Concentration (PHR) | c*25 | L*75 | L*45/L*110 | |
| Ex. 1 | A/a | 15.0/5.0 | 39.0 | 42.3 | 1.13 | 3 |
| Ex. 2 | A/a | 15.0/10.0 | 37.0 | 50.3 | 1.04 | 3 |
| Ex. 3 | B/a | 15.0/5.0 | 46.9 | 44.5 | 1.21 | 2 |
| Ex. 4 | A/b | 15.0/15.0 | 61.7 | 34.7 | 1.43 | 2 |
| Ex. 5 | B/b | 15.0/15.0 | 59.9 | 36.1 | 1.47 | 2 |
| Ex. 6 | A/a/b | 15.0/2.5/10.0 | 50.3 | 38.5 | 1.16 | 3 |
| Comp. Ex. 1 | D/a/c | 7.5/5.0/7.5 | 38.3 | 29.9 | 1.57 | 1 |
| Comp. Ex. 2 | C/b/c | 7.5/15.0/7.5 | 60.4 | 25.3 | 1.54 | 1 |
| Comp. Ex. 3 | D/b/d/e | 3.0/15.0/10.0/2.0 | 46.6 | 33.1 | 1.61 | 1 |
| Comp. Ex. 4 | C/a/b/c | 7.5/2.5/10.0/7.5 | 49.4 | 27.6 | 1.52 | 1 |

A: aluminum paste D601BL (tradename, a colored aluminum pigment, produced by Showa Aluminum Powder K.K., mean particle size: 17 μm) (a blue-colored aluminum pigment comprising an aluminum flake whose surface is adsorbed with a phthalocyanine pigment and is coated thereon with an acrylic resin)
B: Paliocrom Gold L 2020 (tradename, a colored aluminum pigment, produced by BASF A.G., mean particle size: 16 μm) (a red-colored aluminum pigment comprising an aluminum flake whose surface is coated with iron oxide by a gas phase method)
C: aluminum paste 7640NS (tradename, an aluminum flake pigment, produced by Toyo Aluminium K.K., mean particle size: 16 μm)
D: aluminum paste 7680NS (tradename, aluminum flake pigment, produced by Toyo Aluminium K.K., mean particle size: 14 μm)
a: TIPAQUE CR-95 (tradename, a titanium dioxide pigment, produced by Ishihara Sangyo Kaisha, Ltd., mean particle size: 286 nm)
b: MT-500HD (tradename, a particulate titanium oxide pigment, produced by Tayca Corporation, mean particle size: 30 nm)
c: Cyanine Blue G-314 (tradename, a copper phthalocyanine blue pigment, produced by Sanyo Color Works, Ltd.)
d: TOY (tradename, a transparent yellow iron oxide pigment, produced by Hilton-Davis Chemical Co., Ltd.)
e: TOR (tradename, a transparent iron oxide pigment, produced by Hilton-Davis Chemical Co., Ltd.)

Production of Test Plate
Preparation of Substrate
A cationic electrodeposition coating composition
"Electron 9400HB" (tradename; produced by Kansai Paint Co., Ltd.; an epoxy resin and polyamine cationic resin comprising a blocked polyisocyanate compound as a curing agent) was applied to a degreasing- and zinc phosphate-treated steel plate (JIS G3141, size: 400×300×0.8 mm) by electrodeposition to a film thickness of 20 μm when cured. The resulting film was heated at 170° C. for 20 minutes to be cured by crosslinking, thereby obtaining an electrodeposition coating film.

An intermediate coating composition "LUGA BAKE Intermediate Gray" (tradename, produced by Kansai Paint Co., Ltd., a polyester resin/melamine resin base, an organic solvent type) was applied to the surface of the obtained electrodeposition coating film by air spray coating to a film thickness of 30 μm when cured. The resulting film was heated at 140° C. for 30 minutes to be cured by crosslinking. The thus-obtained coated plate comprising an intermediate coating film was regarded as a substrate.

Application
Each of the coating compositions prepared in Examples 1 to 6 and Comparative Examples 1 to 4 was applied to the above-described substrate by air spray coating to a film thickness of 20 μm when cured. After the application, the resulting product was allowed to stand in a laboratory at a room temperature of about 20° C. for about 15 minutes. Thereafter, a clear coating composition (LUGA BAKE Clear, produced by Kansai Paint Co., Ltd., tradename, acrylic resin/amino resin base, organic solvent type) was applied to a film thickness of 30 μm when cured. After the application, the resulting product was allowed to stand at a room temperature for 15 minutes, and heated in a hot air circulating oven at 140° C. for 30 minutes to simultaneously dry and cure the multilayer coating film, thereby obtaining a test plate (coated plate).

Evaluation

The aesthetic of the test plate was evaluated in a manner described below. Table 1 shows the results.

(1) Lightness and Chroma

With respect to each produced coated plate, chroma c* and lightness L* in the L*a*b* color scale were measured using MA68II (tradename) produced by X-Rite, Inc. Specifically, the coated plate was illuminated at an angle of 45 degrees, and chroma c* was measured at a light-receiving angle of 25 degrees (c*25) relative to the specularly reflected light. Further, lightness L* was measured at a light-receiving angle of 75 degrees (L*75) relative to the specularly reflected light. Table 1 shows the results.

(2) Evaluation of Texture

Lightness Change

With respect to each produced coated plate, the lightness L* in the L*a*b* color scale was measured at different light-receiving angles using MA68II (tradename) produced by X-Rite, Inc., and the change in the lightness was evaluated. Specifically, the coated plate was illuminated at an angle of 45 degrees, and the lightness L* at light-receiving angles of 45 degrees and 110 degrees relative to the specularly reflected light was measured (each lightness L* was respectively referred to as L*45 and L*110). Using the obtained measured values, the lightness change was evaluated as a ratio of L*45 to L*110.

Visual Observation

Each obtained coated plate was illuminated with an artificial sunlight lamp (produced by Seric Ltd., color temperature: 6500 K), and the angle of the test plate relative to the lamp was changed to observe and evaluate the lightness change from the face (between the highlight and the shade) to the shade (in an oblique direction), the chroma at the highlight, and the lightness at the shade. The evaluation was performed by five people engaged in color development for three years or more, i.e., two designers and three engineers, and the average values were employed:

3: high chroma at the highlight, high lightness at the shade, and a small lightness change from the face to the shade;
2: high chroma at the highlight, high lightness at the shade, and a large lightness change from the face to the shade; and
1: high chroma at the highlight, low lightness at the shade, and either a large lightness change from the face to the shade or low chroma at the highlight.

Examples 7 to 10

Production Example 2

Production of Acrylic Resin Emulsion 130 parts by mass of deionized water and 0.52 parts by mass of Aqualon KH-10 (tradename, surfactant, produced by Dai-Ichi Kogyo Seiyaku Co., Ltd.) were placed in a reaction vessel equipped with a thermometer, a thermostat, a stirrer, a reflux condenser, and a dropping funnel, then stirred and mixed under a nitrogen stream, and heated to 80° C. Subsequently, 1% of the total amount of a monomer emulsion (1) described below and 5.3 parts by mass of a 6% aqueous ammonium persulfate solution were introduced into the reaction vessel, and maintained at 80° C. for 15 minutes. Thereafter, the remaining monomer emulsion (1) was added dropwise over 3 hours to the reaction vessel maintained at the same temperature. After the completion of the dropwise addition, the mixture was aged for 1 hour. Subsequently, a monomer emulsion (2) described below was added dropwise over 1 hour, followed by aging for 1 hour. Thereafter, the mixture was cooled to 30° C. while 40 parts by mass of a 5% aqueous dimethylethanolamine solution was gradually added thereto, and filtered through a 100-mesh nylon cloth, thereby obtaining an acrylic resin emulsion having a mean particle size of 100 nm (after diluted with deionized water, the mean particle size was measured at 20° C. using a submicron particle size distribution analyzer "COULTER N4" (produced by Beckman Coulter)) and a solids concentration of 30%. The obtained acrylic resin had an acid value of 33 mg KOH/g and a hydroxy value of 25 mg KOH/g.

Monomer emulsion (1): 42 parts by mass of deionized water, 0.72 parts by mass of Aqualon KH-10, 2.1 parts by mass of methylene bis acrylamide, 2.8 parts by mass of styrene, 16.1 parts by mass of methyl methacrylate, 28 parts by mass of ethyl acrylate, and 21 parts by mass of n-butyl acrylate were mixed and stirred, thereby obtaining the monomer emulsion (1).

Monomer emulsion (2): 18 parts by mass of deionized water, 0.31 parts by mass of Aqualon KH-10, 0.03 parts by mass of ammonium persulfate, 5.1 parts by mass of methacrylic acid, 5.1 parts by mass of 2-hydroxyethyl acrylate, 3 parts by mass of styrene, 6 parts by mass of methyl methacrylate, 1.8 parts by mass of ethyl acrylate, and 9 parts by mass of n-butyl acrylate were mixed and stirred, thereby obtaining the monomer emulsion (2).

Production Example 3

Production of Polyester Resin 109 parts by mass of trimethylolpropane, 141 parts by mass of 1,6-hexanediol, 126 parts by mass of hexahydrophthalic anhydride, and 120 parts by mass of adipic acid were placed in a reaction vessel equipped with a thermometer, a thermostat, a stirrer, a reflux condenser, and a water separator. The mixture was heated from 160° C. to 230° C. over a period of 3 hours, followed by a condensation reaction at 230° C. for 4 hours. Subsequently, in order to add carboxyl groups to the obtained condensation reaction product, 38.3 parts by mass of trimellitic anhydride was further added thereto, and reacted at 170° C. for 30 minutes. The reaction product was diluted with 2-ethyl-1-hexanol, thereby obtaining a polyester resin solution having a solids concentration of 70%. The obtained polyester resin had an acid value of 46 mg KOH/g, a hydroxy value of 150 mg KOH/g, and a weight average molecular weight of 6,400. The term "weight average molecular weight" used herein represents a value determined by gel permeation chromatography (GPC) using the calibration curve of standard polystyrene.

Production Example 4

Production of Hydroxy-Containing Acrylic Resin 50 parts of ethylene glycol monoethyl ether acetate was placed in a reaction vessel equipped with a thermometer, a thermostat, a stirrer, a reflux condenser, and a dropping funnel, then stirred and mixed, and heated to 135° C. Subsequently, a mixture of monomer/polymerization initiator described below was added dropwise over 3 hours to the reaction vessel maintained at the same temperature. After completion of the dropwise addition, the mixture was aged for 1 hour. Thereafter, a mixture comprising 10 parts of ethylene glycol monoethyl ether acetate and 0.6 parts of 2,2'-azobis(2-methylpropionitrile) was added dropwise over 1 hour and 30 minutes while maintaining the same temperature, and the resulting product was aged for another 2 hours. Subsequently, the ethylene glycol monoethyl ether acetate was distilled off under a reduced pressure, thereby obtaining a hydroxy-containing acrylic resin having a hydroxy value of 54 mg KOH/g, a number average molecular weight of 20,000, and a resin solids content of 65 mass %. The term "number average molecular weight" used herein represents a value determined by gel permeation chromatography (GPC) using the calibration curve of standard polystyrene.

Mixture of monomer/polymerization initiator: a mixture comprising 38 parts of methyl methacrylate, 17 parts of ethyl acrylate, 17 parts of n-butyl acrylate, 7 parts of hydroxyethyl methacrylate, 20 parts of lauryl methacrylate, and 1 part of acrylic acid; and 2 parts of 2,2'-azobis(2-methylpropionitrile)

Production Example 5

Preparation of Color Pigment Dispersion 1

22.4 parts of MT-500HD (tradename, a particulate titanium oxide pigment, produced by Tayca Corporation, mean particle size: 30 nm), 32 parts of the polyester resin solution obtained in Production Example 4, and 57.6 parts of deionized water were placed in a 225 ml mayonnaise bottle. Then, 130 parts of zirconia beads having a diameter of 1.5 mm were further placed therein, and the bottle was hermetically sealed. The mixture was dispersed for 120 minutes using a shaker-type paint conditioner. After dispersion, the mixture was filtered through a 100-mesh wire screen to remove zirconia beads, thereby obtaining a color pigment dispersion 1.

Production Example 6

Preparation of Color Pigment Dispersion 2

22.4 parts of TIPAQUE CR-95 (tradename, a titanium dioxide pigment, produced by Ishihara Sangyo Kaisha, Ltd., mean particle size: 286 nm), 32 parts of the polyester resin solution obtained in Production Example 3, and 57.6 parts of deionized water were placed in a 225 ml mayonnaise bottle. Then, 130 parts of zirconia beads having a diameter of 1.5 mm were further placed therein, and the bottle was hermetically sealed. The mixture was dispersed for 120 minutes using a shaker-type paint conditioner. After dispersion, the mixture was filtered through a 100-mesh wire screen to remove zirconia beads, thereby obtaining a color pigment dispersion 2.

Production Example 7

Preparation of Concentrated Colored Aluminum Pigment Solution 1

In a stainless steel beaker, 100 parts by mass of

Friend Color D601BL (tradename, a colored aluminum pigment, produced by Showa Aluminum Powder K.K., mean particle size: 17 μm) on a solids basis and 130 parts by mass of ethylene glycol monobutyl ether were stirred and mixed, thereby obtaining a concentrated colored aluminum pigment solution 1.

Production Example 8

Preparation of Concentrated Colored Aluminum Pigment Solution 2

In a stainless steel beaker, 100 parts by mass of Paliocrom Gold L 2020 (tradename, a colored aluminum pigment, produced by BASF A.G., mean particle size: 16 μm) on a solids basis and 130 parts by mass of ethylene glycol monobutyl ether were stirred and mixed, thereby obtaining a concentrated colored aluminum pigment solution 2.

Example 7

100 parts of the acrylic resin emulsion obtained in Production Example 2, 42.9 parts of the polyester resin solution obtained in Production Example 3, 50 parts of the color pigment dispersion 2 obtained in Production Example 6, 34.5 parts of the concentrated colored aluminum pigment solution 1 obtained in Production Example 7, and 37.5 parts of Cymel 325 (tradename, produced by Nihon Cytec Industries Inc., melamine resin, solids content: 80%) were uniformly mixed. Further, Primal ASE-60 (tradename, produced by Rohm & Haas Co., Ltd., a polyacrylic acid thickener), 2-(dimethylamino)ethanol, and deionized water were added thereto, thereby preparing an aqueous coating composition having a pH of 8.0, a coating composition solids content of 25%, and a viscosity of 40 seconds as measured by Ford cup No. 4 at 20° C.

In the coating composition prepared in Example 7, the ratio of the effect pigment to the color pigment is the same as that employed in Example 2.

Example 8

An aqueous coating composition was prepared in the same manner as in Example 7, except that the amount of the polyester resin solution was changed from 42.9 parts to 35.7 parts, and 75 parts of the color pigment dispersion 1 was used in place of 50 parts of the color pigment dispersion 2.

The ratio of the effect pigment to the color pigment in the coating composition prepared in Example 8 is the same as that employed in Example 4.

Example 9

An aqueous coating composition was prepared in the same manner as in Example 7, except that the amount of the polyester resin solution was changed from 42.9 parts to 25 parts, and 50 parts of the color pigment dispersion 1 and 12.5 parts of the color pigment dispersion 2 were used in place of 50 parts of the color pigment dispersion 2.

The ratio of the effect pigment to the color pigment in the coating composition prepared in Example 9 is the same as that employed in Example 6.

Application of each coating composition prepared in Examples 7 to 9 can form a coating film with a coating color that has high chroma at the highlight (in the vicinity of specularly reflected light), and that shows a small lightness change from the face (between the highlight to the shade) to the shade (in an oblique direction).

Comparative Examples 5 to 9

Comparative Examples

An effect pigment and a color pigment were added at a ratio shown in Table 2 per 100 parts (solids content) of a resin component comprising 75 parts of the hydroxy-containing acrylic resin obtained in Production Example 1 and 25 parts of U-Van 28-60 (tradename, butyl-etherified melamine resin, produced by Mitsui Chemicals, Inc.). The mixture was stirred and mixed, then diluted to a viscosity appropriate for coating, and an organic solvent-based coating composition having a solids content of about 25% was prepared. Thereby, a coating composition used in the Comparative Examples 5 to 9 was prepared.

Using each coating composition obtained in Comparative Examples 5 to 9, test plates were prepared and evaluation of the coating films was performed in the same manner as described in "Production of test plate" and "Evaluation."

TABLE 2

| | Pigment Composition | | Colorimetric Value | | Lightness Change | Visual Observation |
|---|---|---|---|---|---|---|
| | Pigment Type | Concentration (PHR) | c*25 | L*75 | L*45/L*110 | |
| Comp. Ex. 5 | A/D/a/c | 1.5/6.75/5/6.75 | 38.4 | 31.1 | 1.56 | 1 |
| Comp. Ex. 6 | A/C/b/c | 4.5/5.3/15/5.3 | 60.8 | 28.1 | 1.53 | 1 |
| Comp. Ex. 7 | A/C/D/ a/b/c | 3.4/2.7/ 3.2/2.5/7.5/5.9 | 49.6 | 30.0 | 1.53 | 1 |
| Comp. Ex. 8 | A/E/a/ d/e | 8.0/8.0/1.0/ 1.2/3.7 | 26.5 | 39.5 | 1.75 | 1 |
| Comp. Ex. 9 | A/E/b/ d/f | 10.0/3.0/8.0/ 8.0/0.1 | 25.1 | 41.8 | 1.64 | 1 |

A, C, D, a, b, c, d, and e are the same as those shown in Table 1.
E: Iriodin 303 Royal Gold (tradename, colored mica, produced by Merck Ltd., PSD 5-40 μm)
f: Monarch 1300 (tradename, carbon black pigment, Cabot Corporation)

INDUSTRIAL APPLICABILITY

The method for forming a coating film of the present invention is applicable to various industrial products, in particular, an automobile exterior panel.

The invention claimed is:

1. A coating composition comprising a resin, a colored aluminum pigment and a titanium oxide pigment,
   wherein the colored aluminum pigment is an aluminum flake whose surface is coated with a phthalocyanine pigment or an iron oxide,
   wherein a content of the colored aluminum pigment is 1 to 30 parts by mass, on a solids basis, relative to 100 parts by mass of a resin solids content of the coating composition,
   a content of the titanium oxide pigment is 0.01 to 50 parts by mass, on a solids basis, relative to 100 parts by mass of the resin solids content of the coating composition,
   a ratio of the content of the colored aluminum pigment to the content of the titanium oxide pigment is 3:1 to 1:1, and
   wherein in the case where a coating film formed from the coating composition is illuminated at 45 degrees with respect to a surface of the coating film, a ratio of lightness $L^*$ in the $L^* a^* b^*$ color scale based on a spectral reflectance of light observed at 45 degrees with respect to a specularly reflected light, relative to lightness $L^*$ in the $L^* a^* b^*$ color scale based on a spectral reflectance of light observed at 110 degrees with respect to the specularly reflected light is within a range of 1.00 to 1.50.

2. The coating composition according to claim 1, wherein the titanium oxide pigment has a mean particle size of 10 to 400 nm.

3. The coating composition according to claim 1, wherein the titanium oxide pigment comprises a particulate titanium oxide pigment having a mean particle size of 20 to 80 nm.

4. A method for forming a coating film, comprising steps of applying the coating composition of claim 1 to a substrate; and further applying a clear coating composition thereto, thereby forming the coating film,
   wherein in the case where the coating film is illuminated at 45 degrees with respect to a surface of the coating film, a ratio of lightness $L^*$ in the $L^* a^* b^*$ color scale based on a spectral reflectance of light observed at 45 degrees with respect to a specularly reflected light, relative to lightness $L^*$ in the $L^* a^* b^*$ color scale based on a spectral reflectance of light observed at 110 degrees with respect to the specularly reflected light is within a range of 1.00 to 1.50.

5. The method according to claim 4, wherein the titanium oxide pigment of the coating composition has a mean particle size of 10 to 400 nm.

6. The method according to claim 4, wherein the titanium oxide pigment of the coating composition comprises a particulate titanium oxide pigment having a mean particle size of 20 to 80 nm.

7. The method according to claim 4, wherein the coating composition is applied so that a thickness thereof is 5 to 30 um when cured,
   the clear coating composition is applied so that a thickness thereof is 15 to 70 μm when cured, and
   the clear coating composition is applied when the coating composition is in an uncured state, and heating the resulting film to simultaneously dry and cure the film.

\* \* \* \* \*